US008825043B2

(12) United States Patent
Rogalski et al.

(10) Patent No.: US 8,825,043 B2
(45) Date of Patent: Sep. 2, 2014

(54) CORDLESS PHONE SYSTEM WITH INTEGRATED ALARM AND REMOTE MONITORING CAPABILITY

(75) Inventors: Gary Rogalski, Richmond (CA); Ralph Tischler, Richmond (CA); Guy Pothiboon, Richmond (CA)

(73) Assignee: VTech Telecommunications Limited, Tai Po, New Territory, Hong Kong ( * ) Notice: Subject to any disclaimer, the term of this patent is extended or adjusted under 35 U.S.C. 154(b) by 600 days.

(21) Appl. No.: 12/695,484

(22) Filed: Jan. 28, 2010

(65) Prior Publication Data

US 2011/0003577 A1 Jan. 6, 2011

Related U.S. Application Data

(63) Continuation-in-part of application No. 11/648,905, filed on Jan. 3, 2007, now abandoned.

(60) Provisional application No. 60/755,848, filed on Jan. 4, 2006.

(51) Int. Cl.
*H04W 4/00* (2009.01)
*H04M 1/272* (2006.01)
*H04M 1/725* (2006.01)

(52) U.S. Cl.
CPC ........ *H04M 1/2725* (2013.01); *H04M 2250/12* (2013.01); *H04M 1/72502* (2013.01); *H04M 1/72538* (2013.01)
USPC .................. 455/426.1; 455/426.2; 455/575.1; 455/404.1; 455/462; 455/417.1

(58) Field of Classification Search
USPC ........ 455/426, 426.1, 575.1, 404.1, 462, 466, 455/414.1
See application file for complete search history.

(56) References Cited

U.S. PATENT DOCUMENTS

| | | | |
|---|---|---|---|
| 4,647,914 A | 3/1987 | Alexander | |
| RE32,856 E | 2/1989 | Milller et al. | |
| 5,309,506 A | 5/1994 | Alexander | |
| 5,923,248 A | 7/1999 | Toledano | |
| 6,044,257 A | 3/2000 | Boling et al. | |
| 6,150,942 A * | 11/2000 | O'Brien | 340/573.1 |
| 6,309,506 B1 | 10/2001 | Kannegieser et al. | |
| 6,400,265 B1 * | 6/2002 | Saylor et al. | 340/531 |

(Continued)

FOREIGN PATENT DOCUMENTS

| | | |
|---|---|---|
| DE | 19532103 | 3/1997 |
| WO | 9907136 | 2/1999 |

OTHER PUBLICATIONS

International Search Report and Written Opinion for PCT/CA2011/050050, dated May 9, 2011.

(Continued)

*Primary Examiner* — Shahriar Behnamian
(74) *Attorney, Agent, or Firm* — Steptoe & Johnson LLP

(57) ABSTRACT

A cordless telephone system provides home security. Each handset associated with the cordless telephone system detects an event, such as a noise level that exceeds a threshold noise level, smoke, carbon monoxide, intrusion or moisture level. If an event is detected the system initiates a telephone call through the base unit to an alert telephone number. When the telephone call to the alert telephone number is established, a message is played to provide notification of the event.

32 Claims, 15 Drawing Sheets

(56) References Cited

U.S. PATENT DOCUMENTS

| | | | |
|---|---|---|---|
| 6,909,357 B1* | 6/2005 | Bandy et al. | 340/5.65 |
| 6,977,585 B2* | 12/2005 | Falk et al. | 340/506 |
| 7,096,001 B2 | 8/2006 | Addy et al. | |
| 7,174,176 B1* | 2/2007 | Liu | 455/462 |
| 2002/0184346 A1* | 12/2002 | Mani | 709/220 |
| 2004/0030531 A1* | 2/2004 | Miller et al. | 702/182 |
| 2004/0110544 A1* | 6/2004 | Oyagi et al. | 455/575.1 |
| 2005/0032503 A1 | 2/2005 | Goto et al. | |
| 2005/0079880 A1* | 4/2005 | Donner et al. | 455/466 |
| 2007/0008104 A1* | 1/2007 | McBain | 340/517 |
| 2010/0127865 A1* | 5/2010 | Marriam et al. | 340/541 |

OTHER PUBLICATIONS

German Office Action re application No. 102007001089.5-31, dated May 9, 2011 (translation provided).

* cited by examiner

CORDLESS PHONE SYSTEM WITH INTEGRATED ALARM AND REMOTE MONITORING CAPABILITY

The present invention claims the benefit of U.S. Provisional Appln. No. 60/755,848, filed Jan. 4, 2006, and U.S. patent application Ser. No. 11/648,905, filed Jan. 3, 2007, which are both hereby incorporated by reference herein in their entireties.

BACKGROUND

1. Field of the Invention

Embodiments of the present invention relate generally to the field of telephone communications. More particularly, the present invention relates to integrating a home security system in a cordless telephone system.

2. Background of the Invention

Home security is a necessary part of modern society. Locks, burglar alarms and the like are designed to keep out intruders who might steal contents of a home or harm its occupants. Whether home or away, a home security system provides comfort to home owners who know that the system will likely warn them and/or authorities of the presence of an intruder.

Unfortunately, modern day home security systems are generally expensive, and difficult to install. For example, windows must be taped and doors must be configured such that they provide notice to the home security system when they are opened. Further, these systems include many mechanical parts, including detectors, that are susceptible to failure and wear. Motion detectors and other devices can provide auditory warnings to a dwelling's occupants. However, unless they are connected to a more expensive monitoring system, they do not provide warnings to home owners or authorities. The expense, in particular, can place home security systems beyond the reach of many home owners. Consequently, a more affordable home security system is required.

BRIEF SUMMARY OF THE INVENTION

Embodiments of the present invention provide a system and method for affordable home security by integrating a home security system into a cordless telephone system. Cordless telephone systems include one or more handsets. The handsets have digital signal processing (DSP) capability, such as voice level detection. Embodiments of the present invention use the DSP capability to detect a noise signal. For example, in one embodiment of the present invention, voice level detection processing is used to detect a noise level. The detection can be periodic or at other pre-established times. The detected noise level is compared to a threshold noise level. If the detected noise level exceeds the threshold noise level, the handset initiates a telephone call to an alert telephone number. The telephone call is initiated through the base unit of the cordless telephone system. When the telephone call is established to the alert telephone number, a message is played. The message indicates that there may be a security breach, such as an intruder. In addition, location of the handset detecting a noise level exceeding the threshold noise level may be provided in the message.

In another embodiment of the invention, the cordless telephone system detects and identifies specific sounds, such as the sound emitted by a smoke detector, a carbon monoxide (CO) detector, a moisture detector, a motion detector or an intrusion detector. The system can then send a specific message to the alert telephone number, indicating the specific problem that needs to be addressed.

In one embodiment, the present invention is a cordless telephone system for providing home security. The cordless telephone system includes a base unit having a base unit memory for storing an alert telephone number to call if a noise level above a threshold noise level is detected. The cordless telephone system additionally includes one or more handsets associated with the base unit, each handset and the base station having a digital signal processor for detecting a noise level and a memory for storing a threshold noise level. In operation, the one or more handsets or the base station detect a noise level and compare it to the threshold level, and cause a message to be played to the alert telephone number.

In another embodiment, the present invention is a method for providing home security using a cordless telephone system. The method begins with detecting a noise level using a handset or the base station of a cordless telephone system. The detected noise level is compared to a threshold noise level. If the detected noise level exceeds the threshold noise level, a telephone call to an alert telephone number is initialized.

For example, the alert telephone number may be the homeowner's mobile telephone number. In that ease, the homeowner can decide whether to call 911 or a security or emergency service, in some embodiments based upon further input provided by the system of the present invention, as described below. The homeowner would thus have the benefit of a home security system without having to pay a monthly fee to a security service. In that embodiment, the system could also place the call directly to 911 or other security or emergency service, upon being instructed to do so by the homeowner.

DETAILED DESCRIPTION OF THE INVENTION

Figure 1:
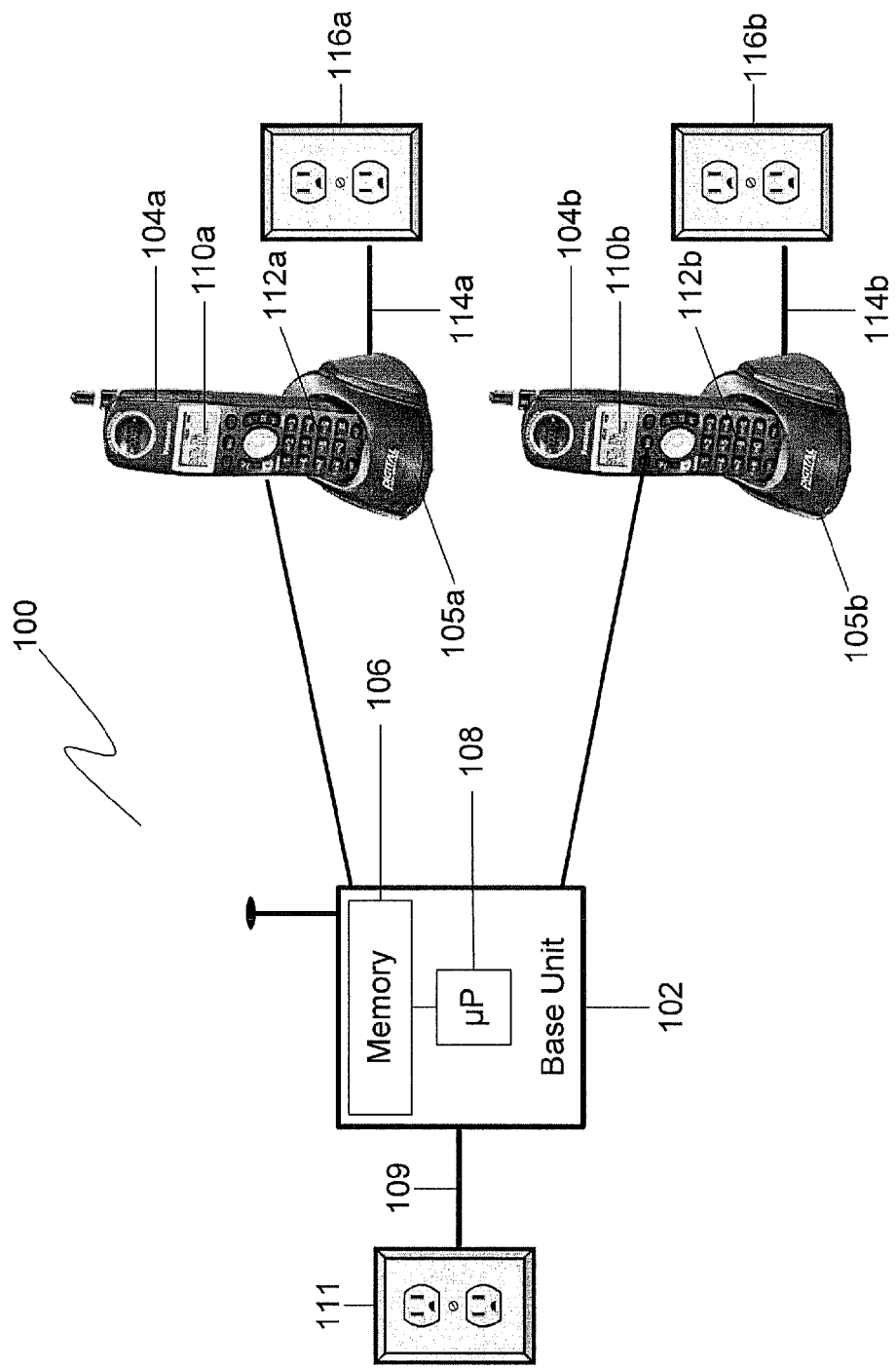
FIG. 1 is a schematic diagram of a cordless telephone system 100 according to an embodiment of the present invention.

FIG. 1 is a schematic diagram of a cordless telephone system 100 according to an embodiment of the present invention. Cordless telephone system 100 includes a base unit 102 and one or more handsets 104a and 104b. Base unit 102 includes a microprocessor 108 or other electronic control circuitry for controlling the functionality of base unit 102. For example, those skilled in the art would understand that the functionality performed by microprocessor 108 performed herein could be performed by any electronic control circuitry for carrying out the functions of microprocessor 108 described herein. Such electronic circuitry, for example, includes microcontrollers, electronic sequencers, field programmable gate arrays (FPGAs) and other electronic circuitry.

Base unit 108 also includes a memory for storing data required for the operation of base unit 102. Base unit 102 may also include a screen for displaying information about telephone calls or stored messages, such as number of stored messages. Base unit 102 may also include one or more cradles for storing one or more handsets, such as handsets 104a and 104b. Each cradle provides power to its handset as well as charges its handset. The cradles are also referred to as chargers. A power cord 109 plugs into a wall socket 111 to provide power to base unit 102

Handsets 104a and 104b are generally stored in cradles 105a and 105b respectively. Cradles 105a and 105b provide power to handsets 104a and 104b respectively, as well as provide for charging the handsets. Cradles 105a and 105b are also referred to as chargers. A power cord 114a plugs into a wall socket 116a to provide power to cradle 105a. A power cord 114b plugs into a wall socket 116b to provide power to cradle 105b.

Handsets 104a and 104b include respective display screens 110a and 110b, and respective keypads 112a and 112b. Display screens 110a and 110b are used to display information about incoming calls such as the telephone number and caller name. Display screen 110a and 110b can also display other information such as date and time, as well as other digital and video data. For example, display screens 110a and 110b are used to provide the man-machine interface ("MMI") for configuring cordless telephone system 100.

Handsets 104a and 104b can also include a microprocessor or other electronic control circuitry and memory for data storage. The microprocessor or other electronic control circuitry works in conjunction with the memory to provide home security capability as described herein.

Embodiments of the present invention enhance conventional cordless telephone systems by integrating home security functionality into the cordless telephone system. According to an embodiment of the present invention, handsets 104a and 104b are configured to detect a security breach, such as an intruder, by detecting noise above a noise threshold. When noise above the noise threshold is detected in one embodiment of the present invention, the handset initiates a telephone call to the home owner through base unit 102. When the telephone call is established, base unit 102 provides a notification message providing notification of the possible security breach.

Because base unit 102 receives handset identification information, it knows which handset is responding to the noise detection. In an embodiment of the present invention, the base unit is configured with location information corresponding to where handsets 104a and 104b are located. The location information can be stored, for example, in a base unit memory 106, along with the corresponding handset identification, such that the location information can be retrieved using the handset identification. For example, handset 104a may be in one bedroom, and handset 104b may be in a second bedroom. Additional handsets may be used for other rooms.

As a result, when the base unit makes the telephone call to the home owner, the base unit can identify the handset detecting noise above the threshold and then obtain location information corresponding to the identified handset. The base unit can then incorporate the obtained location information in the notification message.

Figure 2:
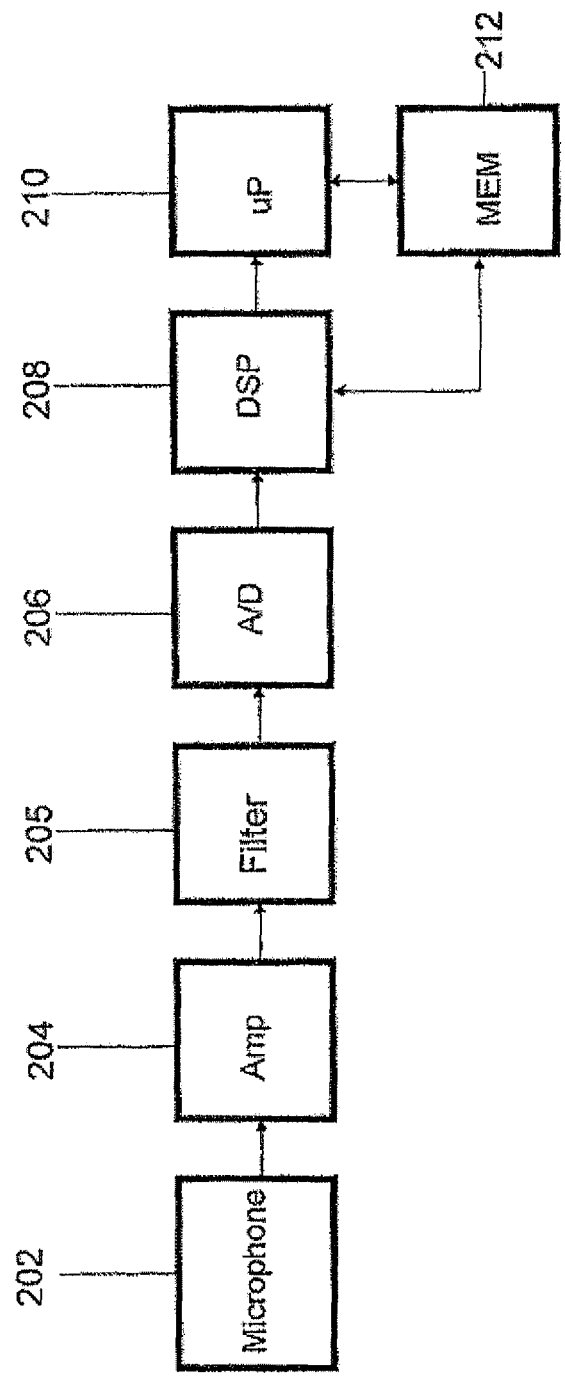
FIG. 2 is a block diagram of apparatus in a handset for home security applications according to an embodiment of the present invention.

FIG. 2 is a schematic diagram of apparatus in a handset such as handset 104a or 104b for home security applications according to an embodiment of the present invention.

In operation, the handset is set for home security operation is placed in the Home Security mode of operation using the MMI on the handset. For example, a soft button labeled "Home Security" may be selected by the home owner. Selection of the Home Security soft button causes the handset to be placed in the Home Security mode of operation.

In the Home Security mode of operation, the handset listens to noise detected as a noise signal detected through a microphone 202. The detected noise signal is conditioned. For example; the detected noise signal can be conditioned by an amplifier 204 and filter 205. The detected noise signal is digitized through an analog-to-digital converter 206 to generate a digitized noise signal.

Detection of the noise signal can be periodic or at other pre-established time. For example, detection of a noise signal could be programmed to take place every second or every minute. Alternatively, noise level detection could be pre-programmed to occur more frequently at night than during the day.

A digital signal processor (DSP) 208 in the handset performs certain processing of the digitized noise signal. For example, DSP 208 may filter the digitized noise signal to smooth it prior to comparing it to a threshold. After filtering the signal, DSP 208 performs determines a signal level associated with the digitized noise signal. Determination of the signal level can be performed using conventional speech level detectors available in cordless telephone systems. The signal level is used by microprocessor 210 in threshold detection. A memory 212 is provided that can be used by DSP 208 or microprocessor 210 during operation. Memory 212 can also be used for storing the threshold noise level.

Alternatively, DSP 208 may be programmed to recognize certain sounds, such as the sound emitted by a smoke detector, a CO detector, a moisture detector or an intrusion detector. Memory 212 may be used to store sounds produced by these detectors, so that DSP 208 may compare the detected sound to the stored sounds, and identify the sound as emanating from a specific one of these detectors.

It would be known to those skilled in the art that the functionality performed by microprocessor 210 performed herein could be performed by any electronic control circuitry for carrying out the functions of microprocessor 210 described herein. Such electronic circuitry, for example, includes microcontrollers, electronic sequencers, field programmable gate arrays (FPGAs) and other electronic circuitry.

A number of threshold detection techniques that can be employed would be known to those skilled in the art. For example, microprocessor 210 can compare the digitized noise level to a threshold level. The threshold level can be pre-determined. However, a pre-determined threshold may not take into account the specifics of a particular home in which an embodiment of the present invention is implemented.

In another embodiment of the present invention, each handset in the cordless system can have a unique threshold level. The base unit can also have a threshold level, and monitor noise levels as described above, for the area in which the base unit is located.

One way for adapting the threshold level to a particular environment according to an embodiment of the present invention is for the home owner to adjust the threshold level using the MMI. For example, the MMI may provide a soft button for increasing sensitivity (by decreasing the threshold) or decreasing sensitivity (by increasing the threshold). Decreased sensitivity might be appropriate for a home with animals that might create a noisier environment than one without animals.

A technique for adapting the threshold level to a particular environment according to another embodiment of the present invention is to determine the threshold level in a set up mode. In the set up mode, for example, the threshold level is calibrated for handset 100 by determining a noise level when there is no security breach. For example, this can be accomplished by allowing handset 100 to record an ambient noise level during a Security Calibration mode of operation. In one embodiment of the present invention, the Security Calibration mode of operation is selected by selecting a soft button in the MMI labeled "Security Calibration". The noise level so determined is stored for later comparison with the digitized noise level when the cordless telephone system is set to operate in the Home Security mode of operation. The Security Calibration mode may also be used to record and store sounds emitted by sensors such as a smoke detector, a CO detector, a moisture detector and/or an intrusion detector.

When the cordless telephone system is set to operate in the Home Security mode of operation, microprocessor 210 compares the digitized noise level with the stored threshold level. Microprocessor 210 determines what action to take based upon whether the digitized noise exceeds the threshold level. If the digitized noise does not exceed the threshold level, microprocessor 210 takes no additional action. If, on the other hand, the digitized noise exceeds the threshold level, microprocessor 210 can take a number of actions.

In one embodiment of the present invention, when the threshold level is exceeded, microprocessor 210 initiates a telephone call through base unit 102 to an alert telephone number. Such an alert telephone number can be provided by the home owner. The alert phone number is stored in base unit memory 106. For example, the phone number can be stored in a configuration phase to use an embodiment of the present invention. Upon making a connection to the alert telephone number, either base unit 102 or the handset that sensed the threshold level being exceeded plays a notification message to the user. The notification message can be any informational message. For example, the notification message may tell the home owner that there is a possible security breach, such as an intruder.

In addition, the notification message may identify the particular location where the intruder may be. In one embodiment of the present invention, location identification is provided by determining which handset detected the threshold level being exceeded. This can be done in base unit 102 by detecting handset identification information the handset sends to base unit 102. During a Security Configuration mode of operation, a location corresponding to each handset 104a and 104b is stored in base unit memory 106. For example, one handset may have as its corresponding location stored in the base unit memory, the bedroom. Another handset may have as its corresponding location stored in the base unit memory, the living room. When a handset (e.g., handset 104a or 104b) initiates a telephone call to the alert number, base unit 102 accesses memory 106 to find the location associated with the handset, and adds the associated location to the notification message.

The messages can be stored in a memory in the handset or in base unit memory 106. Using well known voice synthesis techniques, the message can be played to the home owner after the call is established to the alert telephone number.

In another embodiment of the present invention, the handset sensing that the threshold has been exceeded, plays a message through its speaker. The message can be any message. For example, the message can be, "This property is protected by an alarm system." Such a message can also be generated by the base unit through its speakerphone.

In an alternate embodiment of the present invention, multiple threshold levels are determined, for example at different times of the day. These thresholds are stored and used for comparison purposes as described above. More complex threshold detection can be used as would be known to those skilled in the art.

An additional feature of the present invention is provided by the memory in either the base unit or the handset. That is using the microphone of the handset, any audio information detected by the microphone can be saved to the memory. In an alternative embodiment of the present invention, audio detected by the handset is transmitted to the base unit for storage in a memory associated with the base unit.

The apparatus of FIG. 2 can also be implemented in base unit 102. In this manner, base unit 102 can also detect a security breach, and initiate a notification to the alert telephone number.

Figure 2A:
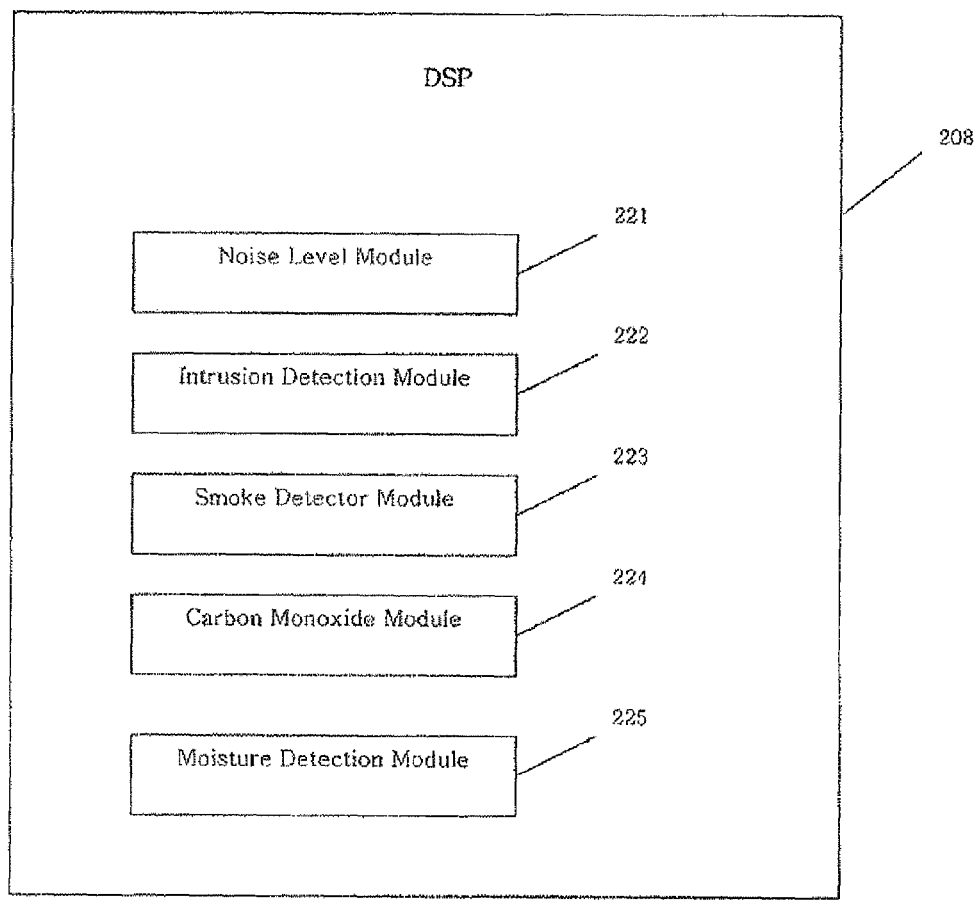
FIG. 2a is a block diagram of a digital signal processor containing several modules according to an embodiment of the present invention.

FIG. 2a is a block diagram of a digital signal processor (DSP) containing several modules according to an embodiment of the present invention. In this embodiment, digital signal processor 208 contains different modules for detecting events, such as a noise level module 221, an intrusion module 222, a smoke detection module 223, a carbon monoxide detection module 224 and a moisture detection module 225. Other modules for detecting other events may also be included. In this embodiment, the detectors (other than the noise level detectors) are standard products that emit sound alerts at characteristic frequencies. The DSP analyses the sounds received at the handset's or base station's microphone, determines based, e.g., on the frequency of the sound, whether the sound is produced by the intrusion system (e.g., a window being opened), a motion detector a smoke alarm, a carbon monoxide alarm, or a moisture detector alarm. Alternatively, the DSP may compare the detected sounds to previously recorded samples of the sounds emitted by each of the smoke, intrusion, carbon monoxide or moisture detectors. A signal is then provided to the base station to trigger the appropriate action.

Figure 3:
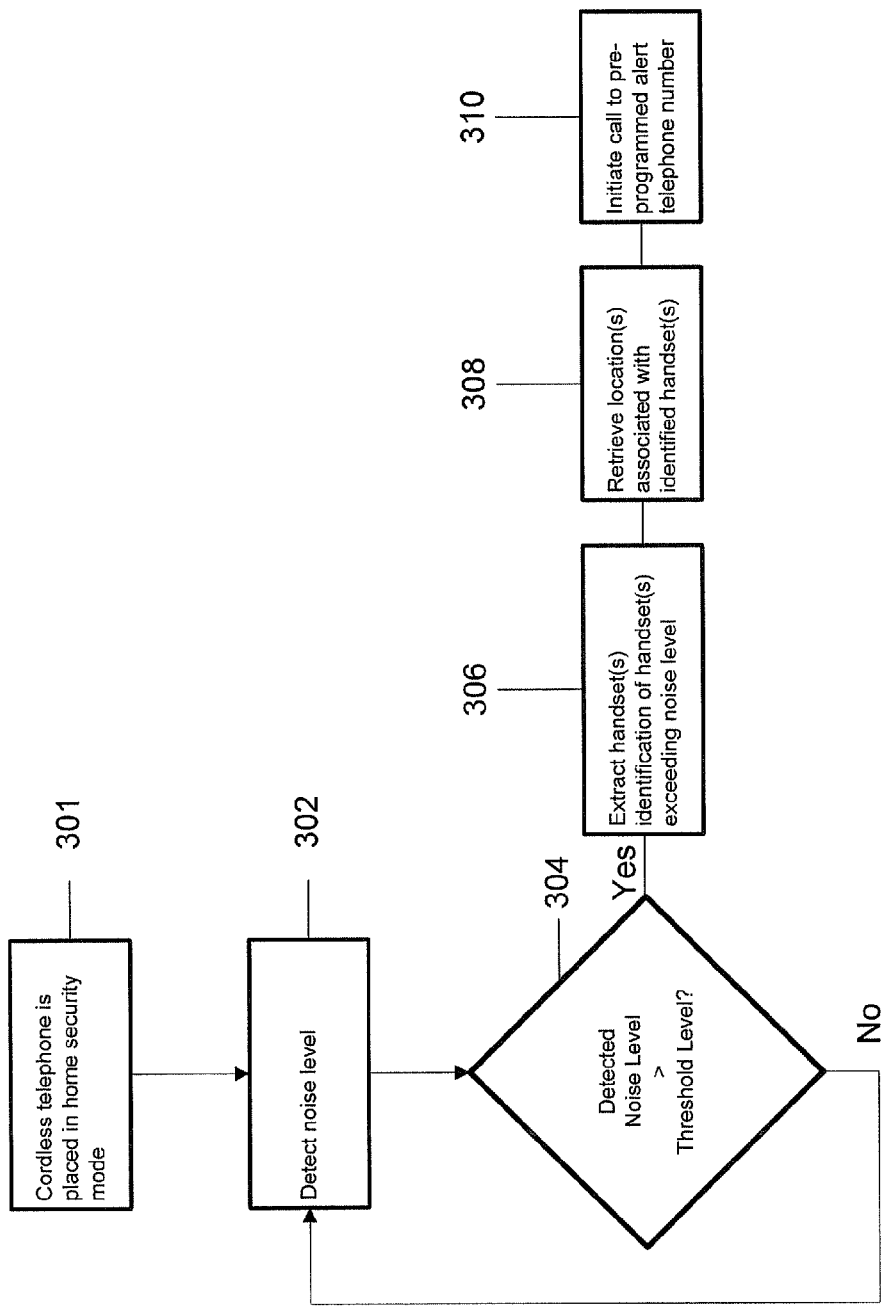
FIG. 3 is a flow chart for a method for integrating home security into a cordless telephone system according to an embodiment of the present invention.

FIG. 3 is a flow chart for a method for integrating home security into a cordless telephone system according to an embodiment of the present invention. In step 302, the noise level is detected. For example, the noise level is detected using the a cordless telephone handset. In step 304, the detected noise level is compared to a threshold level. If the noise level does not exceed the threshold level, the method continues in step 302 where the noise level is again detected. If, on the other hand, the detected noise level, exceeds the threshold level, the method continues in step 306 where identification of the handset that detected the noise level in excess of the threshold is determined. In step 308, the location of the handset that detected the noise level in excess of the threshold is determined based on the handset identification determined in step 306. Then, in step 310, a telephone call is initiated to a alert telephone number, for example, provided by the home owner, to send a notification message of the security breach. In one embodiment of the present invention, the telephone call is initiated through the base unit of the cordless telephone system by the handset detecting the noise level exceeding the threshold level.

In an alternate embodiment of the present invention, the notification message does not include the location of a security breach. In such an embodiment, steps 306 and 308 are not required. As a result, after the method determines that the threshold has been exceeded in step 304, the method in such an embodiment continues in step 310 where a call is initiated to the alert telephone number to provide notification of the security breach.

Figure 4:
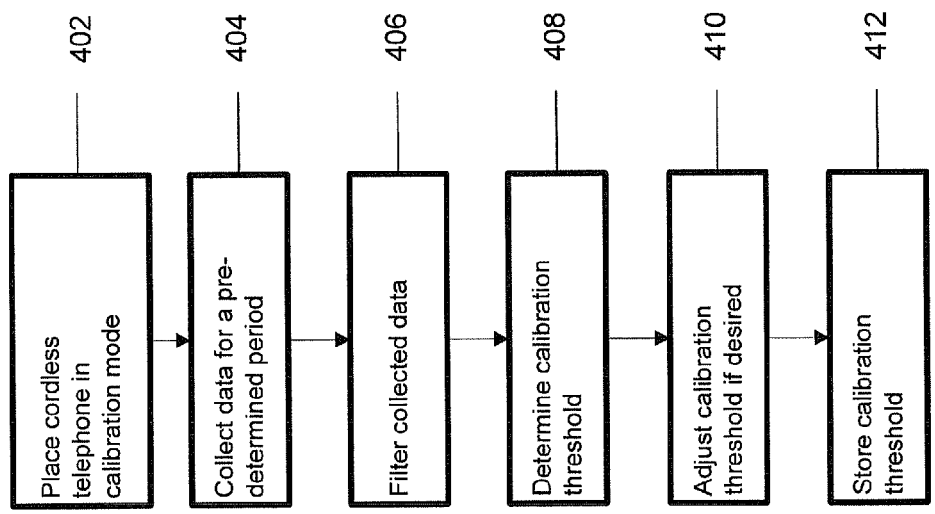
FIG. 4 is a flow chart for a method for calibrating a cordless telephone having integrated security features according to an embodiment of the present invention.

FIG. 4 is a flow chart for a method for calibrating a cordless telephone having integrated security features according to an embodiment of the present invention. In step 402, a user places the cordless telephone in a Security Calibration Mode of operation on handset 104a or 104b or base unit 102, depending on which unit is being calibrated at the time. In one embodiment of the present invention, the user does this by selecting a "Security Calibration" soft button on the MMI. Once in the Calibration Mode of operation, in step 404, the unit (handset 104a or 104b or base unit 102) collects data for a predetermined period of time.

In step 406, the data is filtered, for example, using filter 205. Prior to filtering, the date may be amplified if desired. In step 408, a calibration threshold is determined. The calibration threshold can be the average value of the collected filtered noise. In another embodiment, the threshold may be chosen as a noise value that is a chosen number of standard deviations away from the average noise value. Any desired function can be used to determine the noise threshold based on the collected noise. In step 410, the threshold is adjusted if desired as described above, for example, to suit the particular environment in which the cordless telephone security features are to be used. After any adjustment of the calibration threshold in step 410, or after determining the calibration threshold in step 408 where no adjustment is desired, the calibration threshold is stored in step 412.

Figure 5:
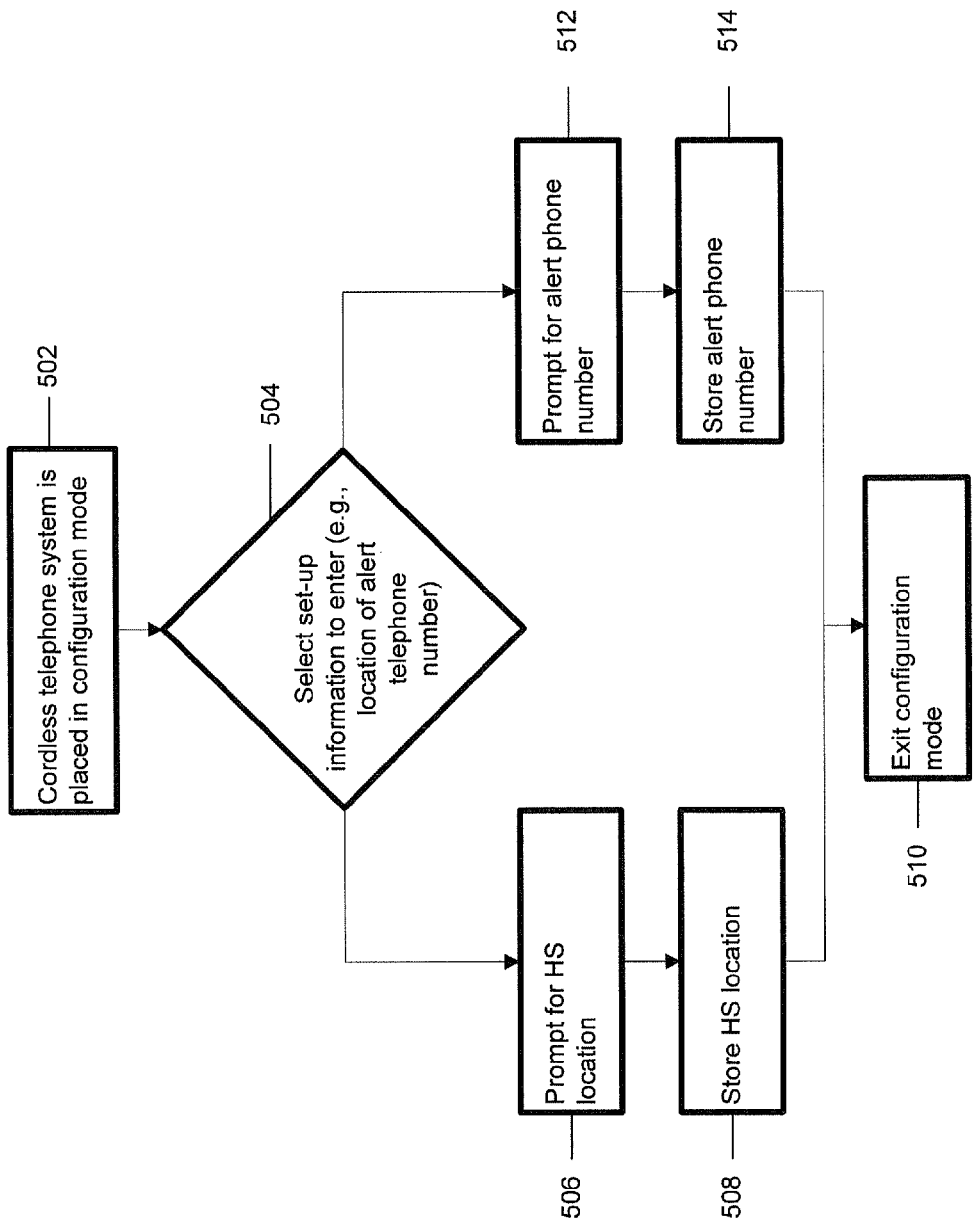
FIG. 5 is a flow chart for a method for configuring a cordless telephone having integrated security features according to an embodiment of the present invention.

FIG. 5 is a flow chart for a method for configuring a cordless telephone having integrated security features according to an embodiment of the present invention. In step 502, the cordless telephone system is placed in a Configuration Mode of operation. In one embodiment of the present invention, the user does this by selecting a "Configuration Mode" soft button on the MMI. Once in the Configuration Mode of operation, in step 504, the desired configuration information to be input is selected. In the embodiment shown in FIG. 5, the user can select to enter the location of a handset or the alert telephone number to which the notification is sent. If the user selects to enter a handset location, the method continues in step 506 where the user is prompted to enter the handset location. The user then enters the handset location, for example, by typing the location for a particular handset using the keypad of base unit 102. The handset location is stored in step 508. The Configuration Mode of operation is then exited in step 510.

If the user chooses the provide an alert telephone number to be called in the event of a security breach in step 504, the method continues in step 512 where the user if prompted to enter the alert telephone number. The user enters the alert telephone number using a keypad on base unit 102. The alert telephone number is stored in step 514. The method is then exited in step 510.

Although an embodiment of the present invention for home security purposes has been described in terms of a home and a home owner, the present invention can be used in any environment in which a cordless telephone system can be used. For example, an embodiment of the present invention can be used in an office building to provide a less expensive alternative for office protection.

In addition, a miniature camera can be incorporated into the handset and/or base unit. When a security breach is detected (i.e., the detected noise level exceeds the threshold level), the camera is turned on to store video imagery of the room in which the security breach occurred. In an alternate embodiment, the camera may be configured to record one or more photographs of the room in which the security breach occurred.

Additional monitors could be added to the handsets and/or base unit of the cordless telephone system to provide indications of adverse or dangerous conditions in a home. For example, a carbon monoxide (CO) monitor or moisture monitor could be added to one or more of the handsets and/or the base unit. If a CO level detected by the CO monitor exceeded a CO threshold level, a telephone call would be initiated to the alert telephone number to advise the home owner of a possible dangerous condition in the home. Similarly, if a moisture level detected by the moisture monitor exceeded a moisture threshold, a call would be initiated to the alert telephone number to advise the home owner of a possible moisture problem in the home.

In another embodiment of the present invention, a motion detector can be added to one or more of the handsets and/or the base unit of the cordless telephone system. In the Home Security mode of operation, if a motion detector detects motion (indicative of a security breach), a message is sent to the alert telephone number. In addition, a message can be played through the speaker of the handset and/or a speaker on the base unit to announce the property is protected by a security system. Alternatively, in addition to or instead of a motion detector, the home may be equipped with an intrusion detection system, which triggers an audible alarm whenever a window or outside door is opened.

In an embodiment of the present invention, the base unit of the cordless phone system calls the user on his mobile phone (or at another designated remote telephone number entered by the user into the system prior to placing the cordless telephone system in home security mode). As shown in FIGS. 6, 6a, 6b, 6c, 7 and 7a, the user receives the call on his mobile telephone 601 (or other designated phone) over the mobile phone network (or over another network). Thus when the alert phone number is the user's phone number, the user can decide whether or not to call police or security based on his knowledge of the situation at home. For example, the user may have learned that a relative or friend or guest would arrive at the home after he or she had left home, and that a call to police or other security services was not necessary.

Figure 6:
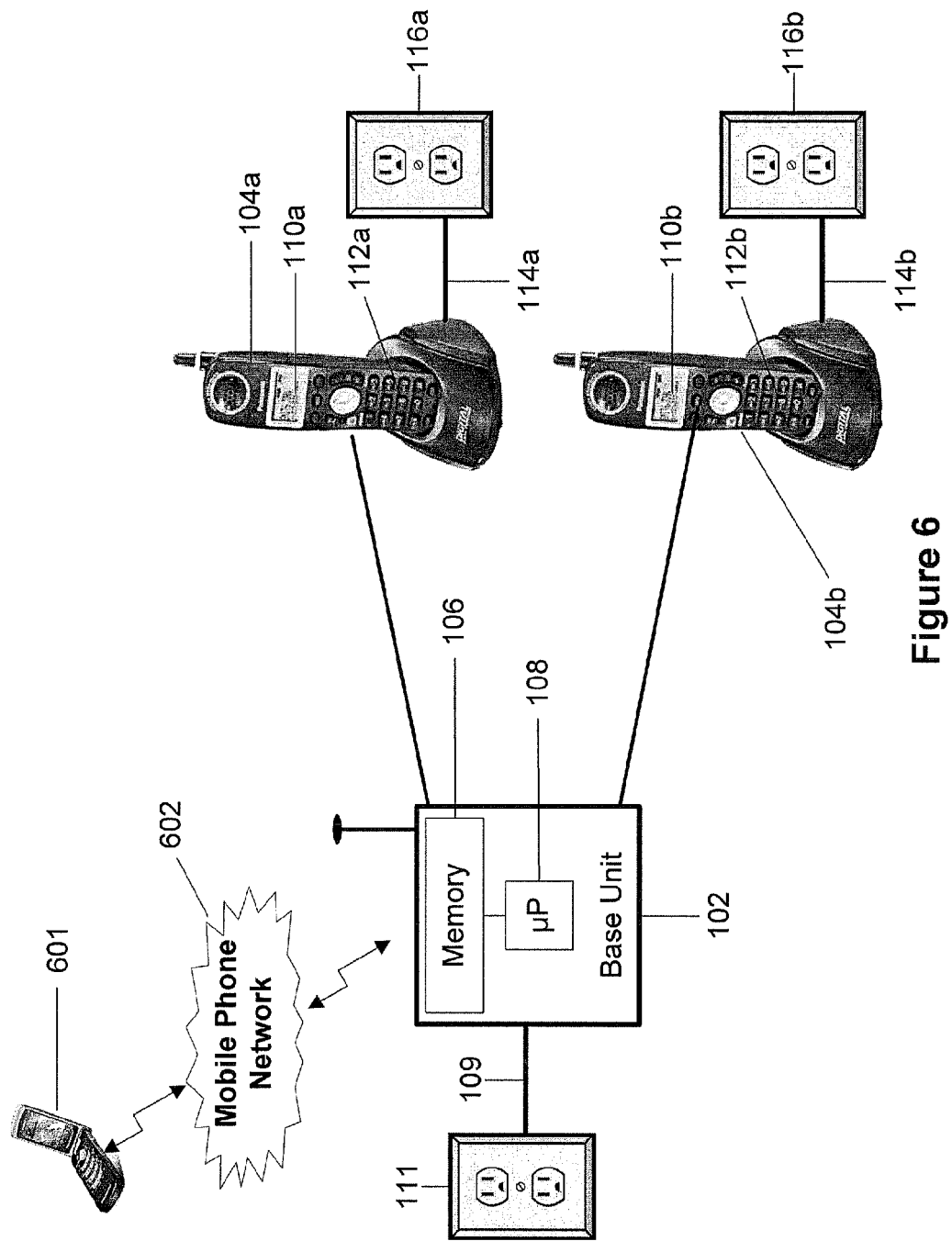
FIG. 6 is schematic diagram of a cordless telephone system with integrated alarm and remote sensing capability according to an embodiment of the invention.
Figure 6A:
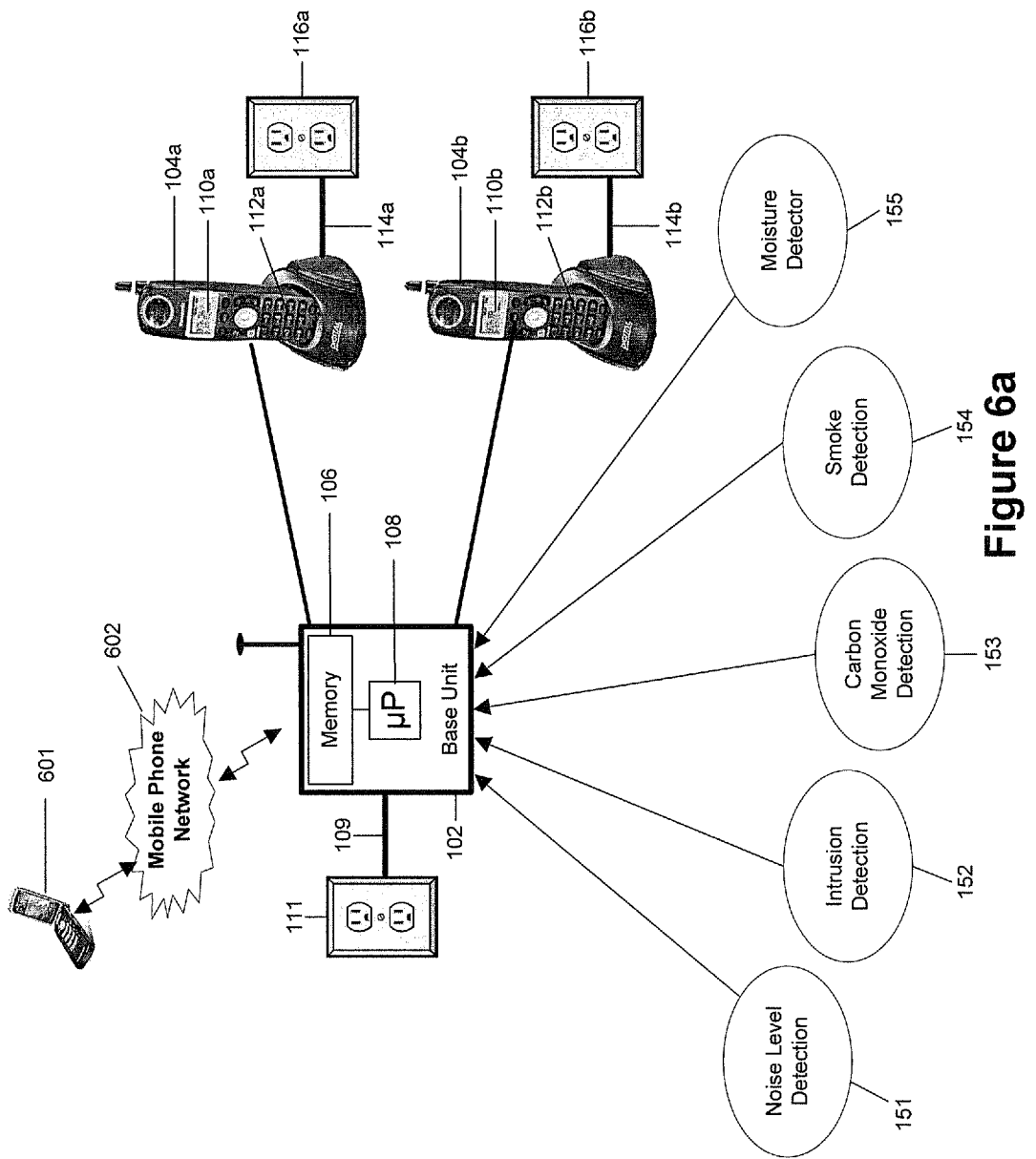
FIG. 6a is schematic diagram of a cordless telephone system, showing detectors for noise level, intrusion, carbon monoxide, smoke and moisture.
Figure 6B:
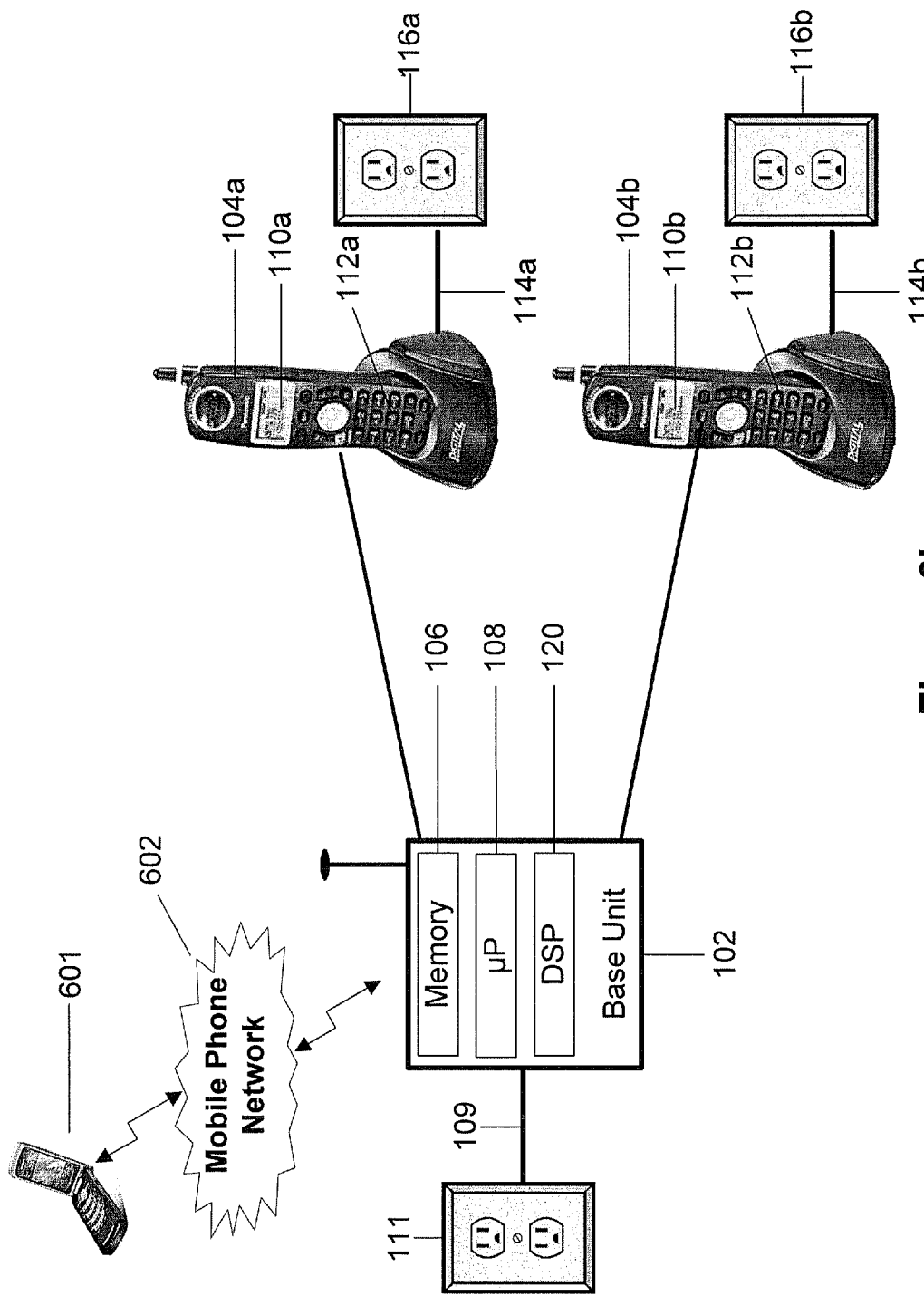
FIG. 6b is schematic diagram of a cordless telephone system with a digital signal processor that identifies events according to an embodiment of the invention.
Figure 6C:
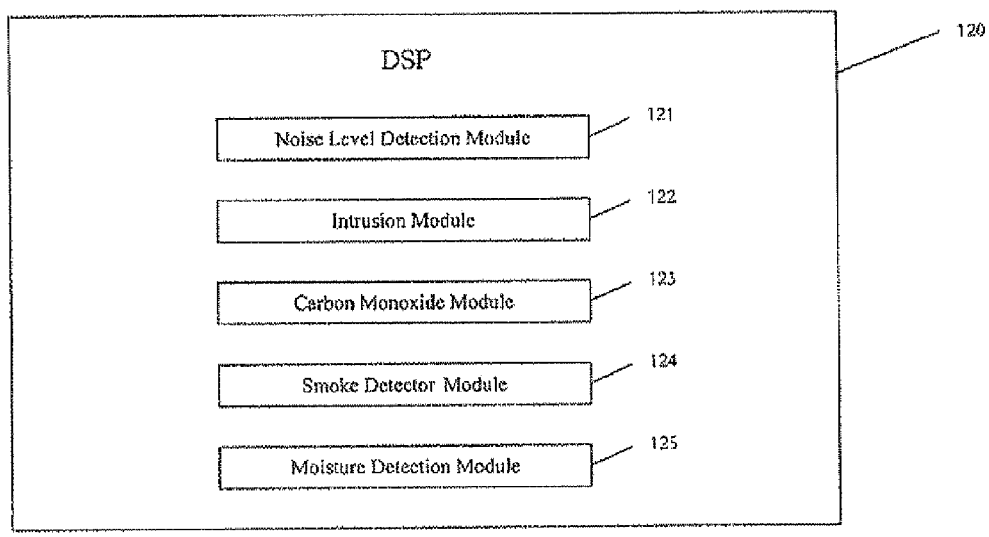
FIG. 6c is a schematic diagram showing exemplary modules within the digital signal processor of FIG. 6b.

In the embodiment shown in FIG. 6a, the event detectors are separate from the base unit and communicate wirelessly (or over wires) or may be integrated into the base unit. In the embodiment shown in FIGS. 6b and 6c, the base unit contains a DSP that analyzes sounds and detects events such as intrusion, smoke, carbon monoxide or moisture, as explained above with respect to FIG. 2a. Alternatively, these modules may be included in the handsets' DSPs.

Figure 7:
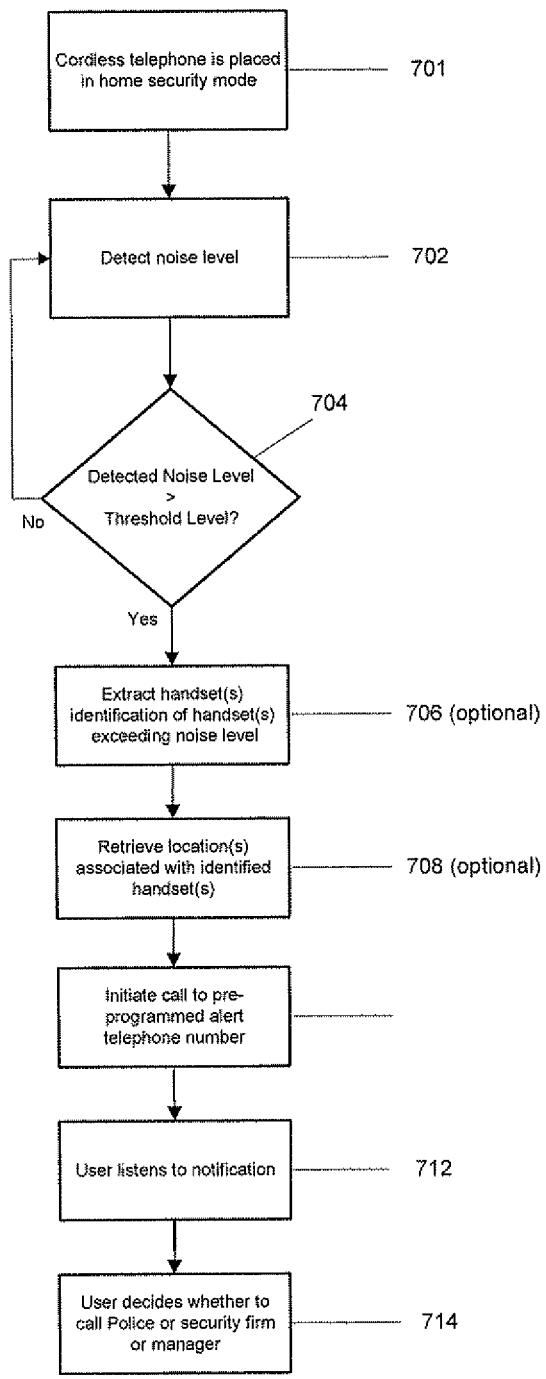
FIG. 7 is a flow chart of a method for using the system shown in FIG. 6.
Figure 7A:
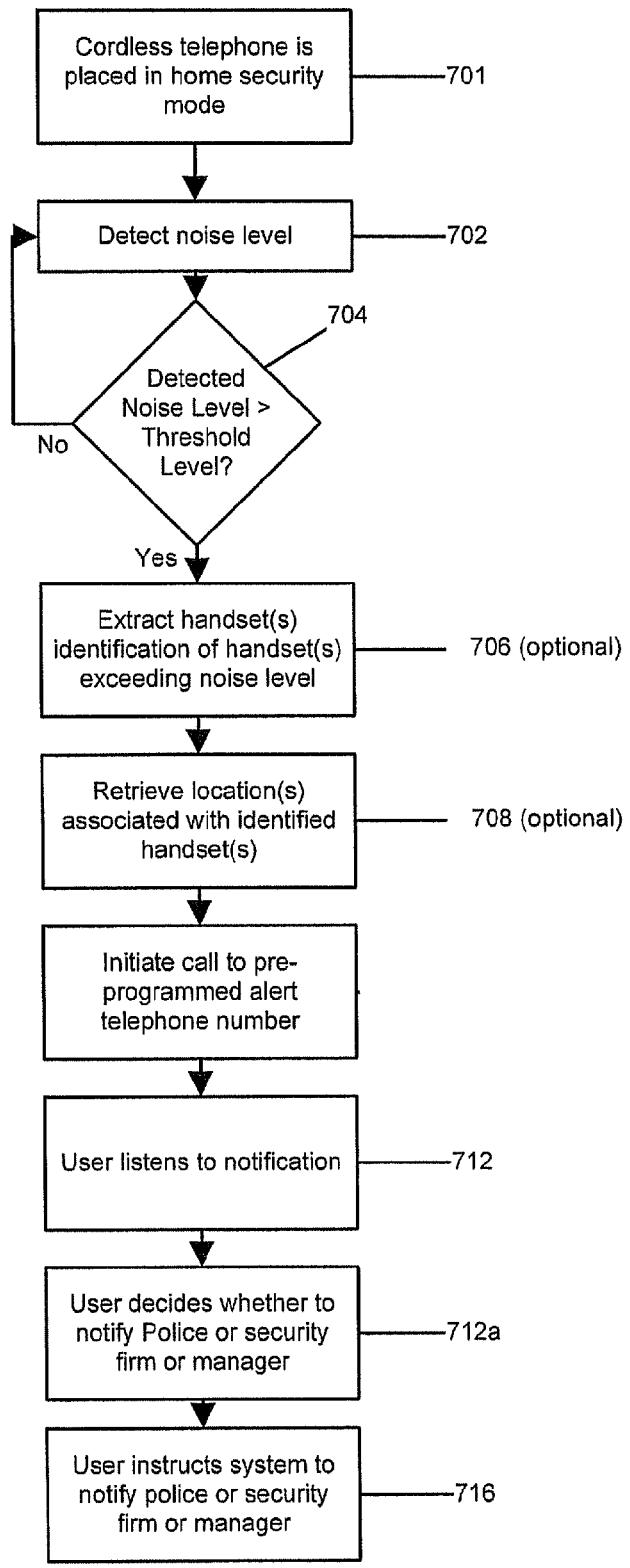
FIG. 7a is a flow chart of an alternative method for using the system shown in FIG. 6.

In the embodiment shown in FIG. 7a, when the user decides that an emergency is indeed occurring, the user can instruct the cordless phone system to place a call directly to the appropriate emergency service, e.g., by pressing three 9's on his telephone. This could be a useful feature when the user is at a remote location (e.g., the user is in California but his home is in British Columbia) such that requiring the user to make the call himself or herself may be inconvenient or difficult and might waste possibly valuable minutes in calling the emergency service.

Figure 8:
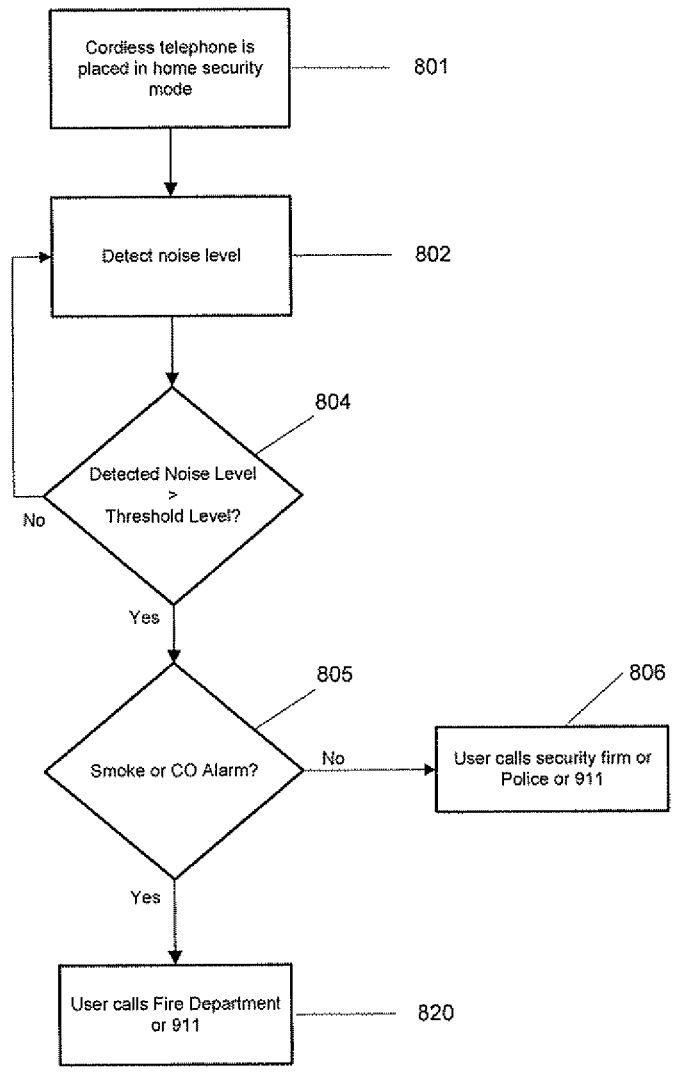
FIG. 8 is a flow chart of a second method for using the system shown in FIG. 6.

In the embodiment shown in FIG. 8, the cordless phone system does not have a separate CO monitor, moisture detector or smoke detector incorporated therein. Instead, the cordless phone handset and/or the base units include a detector that recognizes the sound as emanating from a smoke detector, moisture detector or from a CO detector, based, e.g., on the frequency of the sound. The user can then call the fire department or 911 or other service directly upon notification of an event, instead of having to make a generic 911 or other call. Also, if the user has equipped his or her home with intrusion detection sensors, that emit a sound when a door or window is opened, the handset and/or the base unit may include a detector that recognizes the sound as emanating from an intrusion detection sensor based, e.g., on the frequency of the sound, and can then inform the user that a window or door has been opened, so that the user can call the police or other security service.

The cordless phone system can also be trained to recognize different sounds so that it can send the appropriate message to the user at his or her mobile phone or other remote telephone. For example, the user can pre-record the sounds made by the smoke, CO and/or intrusion detectors, and can record a message for each of these alerts. The phone system would then try to match the detected sound to the recorded sound, and if there is a match, the cordless phone system would play the corresponding message for the user (or send the user a text message, for example).

Figure 9:
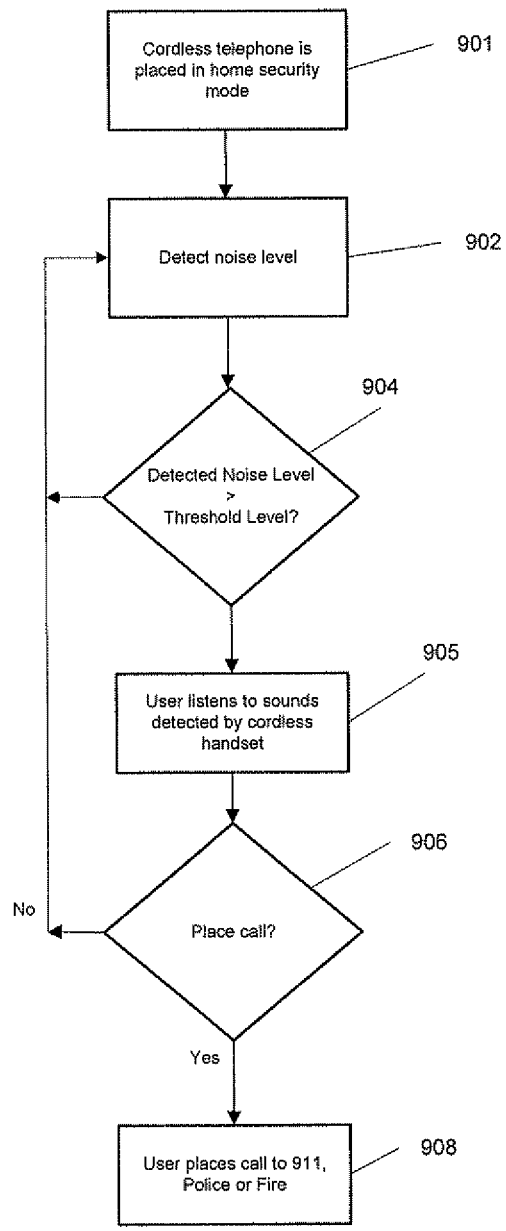
FIG. 9 is a flow chart of a third method for using the system shown in FIG. 6.

In the embodiment shown in FIG. 9, the handset transmits the sounds that it detects to the user over his mobile telephone or other remote phone, who then determines whether to make a call and who to call. For example, the user may recognize the sounds as a television set that may have been left on, or hear a normal conversation among family members and realize that there is no emergency. However, if the user hears more suspicious sounds that might indicate the presence of a burglar, the user can call the police or a security service or some other service. The user may also recognize the sound from a smoke, moisture, intrusion or CO detector, and act accordingly.

Figure 9A:
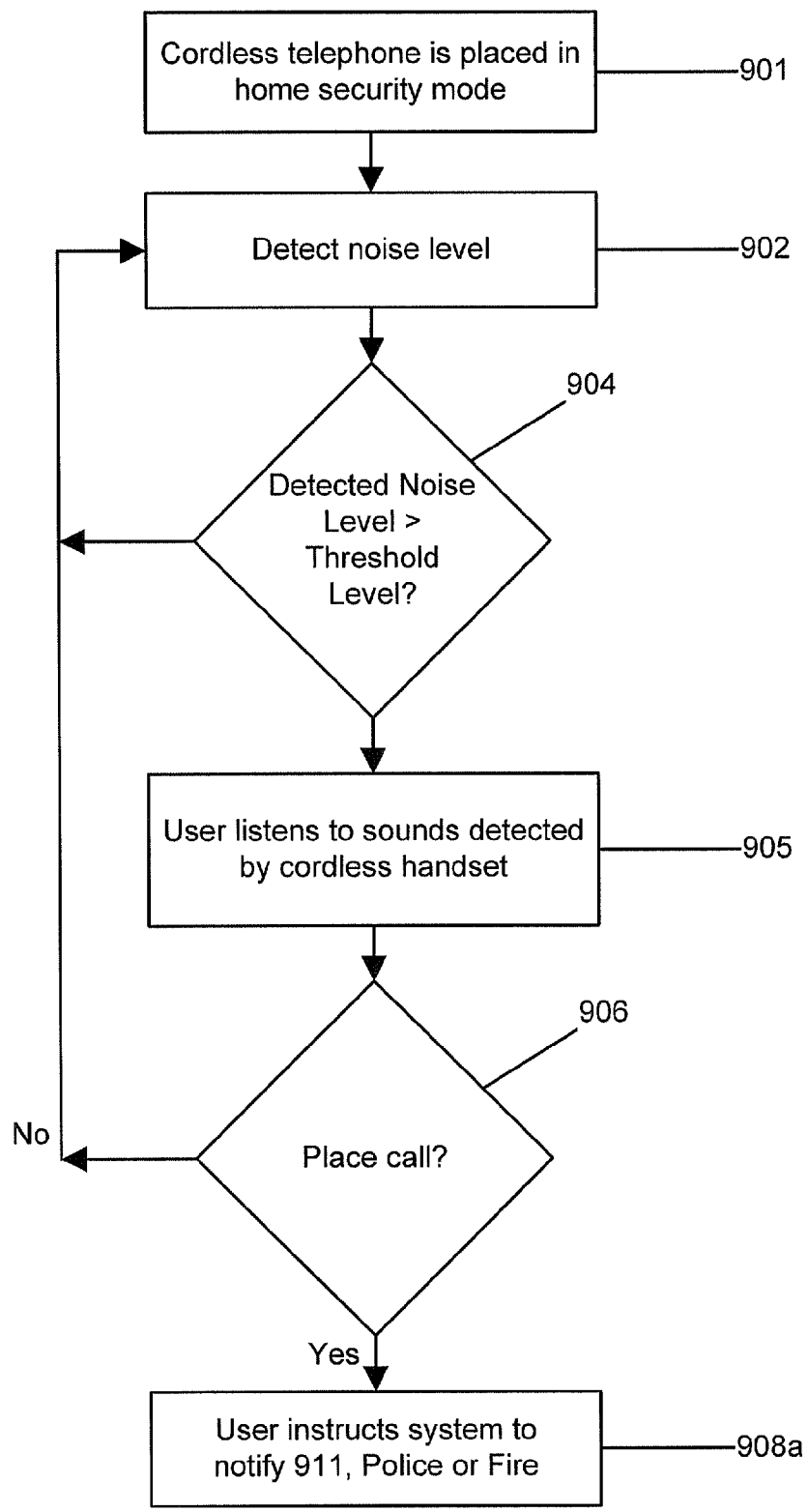
FIG. 9a is a flow chart of an alternative method for using the system shown in FIG. 6.

In the embodiment shown in FIG. 9a, when the user decides that an emergency is indeed occurring, the user can instruct the cordless phone system to place a call directly to the appropriate emergency service, as described above with reference to FIG. 7a.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A cordless telephone system for notifying a home owner of a possible home security event in a home of the home owner, the cordless telephone system, comprising:
 a base unit having a base unit memory configured to store an alert telephone number for a mobile telephone of the home owner; and
 a plurality of handsets associated with the base unit, each handset having a digital signal processor configured to detect a noise level,
 wherein during a home security mode of operation of the cordless telephone system, each of the plurality of handsets is configured to:
 detect a noise level;
 compare the detected noise level to a threshold noise level; and
 in response to detecting that the noise level exceeds the threshold noise level, cause a call to be initiated to the mobile telephone of the home owner associated with the alert telephone number and a notification message to be presented to the home owner via the call to the mobile telephone, and wherein the notification message includes a location of a handset that has detected noise level that exceeds the threshold noise level.

2. The cordless telephone system of claim 1, wherein the location associated with each of the one or more handsets is stored in the base unit memory.

3. The cordless telephone system of claim 1, further comprising a motion detector in one or more of the handsets and base unit.

4. The cordless telephone system of claim 1, further comprising a carbon monoxide detector in one or more of the handsets and base unit.

5. The cordless telephone system of claim 1, further comprising a moisture detector in one or more of the handsets and base unit.

6. The cordless telephone system of claim 1, further comprising a camera to record video or one or more snapshots of a room in which a handset or base unit detects a threshold noise level exceeded.

7. The cordless telephone system of claim 1, further comprising one or more speakers through which a notification message can be played.

8. The cordless telephone system of claim 7, wherein the at least one or more speakers is/are in one or more of the handsets and the base unit.

9. The cordless telephone system of claim 1, wherein one or more of the handsets comprises one or more of a motion detector, a carbon monoxide detector, a smoke detector and a moisture detector.

10. The cordless telephone system of claim 1, wherein audio information is stored to the base unit memory when the threshold noise level is exceeded.

11. The cordless telephone system of claim 1, wherein there is a plurality of threshold noise levels, each threshold noise level corresponding to a different time of day.

12. The cordless telephone system of claim 1, further comprising a calibration mode of operation for calibrating the threshold noise level.

13. The cordless telephone system of claim 1, further comprising a configuration file, wherein the configuration file includes the alert telephone number.

14. The cordless telephone system of claim 13, wherein the configuration file includes a location of each handset.

15. The cordless telephone system of claim 1, wherein the handsets and/or the base station comprise a digital signal processor that is programmed to identify sounds emitted by at least one of a smoke detector and a CO detector.

16. The cordless telephone system of claim 1, wherein the handsets and/or the base station comprise a digital signal processor that is programmed to identify sounds emitted by a moisture detector.

17. The cordless telephone system of claim 1, wherein the handsets and/or the base station comprise a digital signal processor that is programmed to identify sounds emitted by an intrusion detector.

18. The cordless telephone system of claim 1, wherein one or more of the handsets and the base station further comprise at least one of a smoke detector, a carbon monoxide detector, a moisture detector and an intrusion detector.

19. A method for notifying a home owner of a possible home security event detected in a home of the home owner, the method, comprising:
    placing a cordless telephone system in a home security mode of operation;
    entering a phone number for a mobile telephone of the home owner into the cordless telephone system;
    detecting an event in the home through a plurality of the handsets and the base station of the cordless telephone system that are positioned in various locations in the home, each handset including noise detection control circuitry and a speaker;
    using the phone number to initiate a telephone call to the mobile telephone of the home owner upon one of the plurality of handsets detecting noise level exceeding a threshold noise level; and
    presenting the home owner a notification message regarding the detected event via the initiated telephone call, wherein the notification message includes a location of a handset that has detected noise level that exceeds the threshold noise level.

20. The method of claim 19, wherein the event is one of a noise level that exceeds the threshold noise level, an intrusion, smoke, carbon dioxide and moisture.

21. The method of claim 19, wherein the event is a noise level that exceeds the threshold noise level, further comprising determining the threshold noise level by calibration.

22. The method of claim 21, further comprising determining a plurality of threshold noise levels, each threshold noise level corresponding to a different time of day.

23. The method of claim 19, further comprising storing the location corresponding to at least one handset of the cordless telephone system in a configuration file.

24. The method of claim 19, wherein one or more of the base station and the handsets comprises a digital signal processor that identifies events based upon one or more of the following:
    a noise level that exceeds a threshold noise level;
    an audible sound characteristic of a smoke detector;
    an audible sound characteristic of a carbon monoxide detectors;
    an audible sound characteristic of an intrusion detector; and
    an audible sound characteristic of a moisture detector.

25. The method of claim 21, further comprising playing a message through a speaker at the determined location.

26. The method of claim 21, further comprising storing video of the determined location.

27. The method of claim 21, further comprising storing at least one photograph of the determined location.

28. The method of claim 19, wherein the home owner may instruct the cordless phone system to directly alert an emergency service by entering a predetermined sequence of keypad entries.

29. The method of claim 19, wherein the event is a moisture detection.

30. The method of claim 19, wherein the event is a detection of carbon monoxide.

31. The method of claim 19, wherein the event is a detection of motion.

32. The method of claim 19, wherein the event is an intrusion detection.

* * * * *

UNITED STATES PATENT AND TRADEMARK OFFICE
CERTIFICATE OF CORRECTION

PATENT NO. : 8,825,043 B2  
APPLICATION NO. : 12/695484  
DATED : September 2, 2014  
INVENTOR(S) : Gary Rogalski, Ralph Tischler and Guy Pothiboon It is certified that error appears in the above-identified patent and that said Letters Patent is hereby corrected as shown below:

In the Specification

Column 2, In line 25, replace "ease" with --case--

Column 4, In line 48, delete "performs"

Column 7, In line 39, replace "date" with --data--

Signed and Sealed this  
Thirteenth Day of January, 2015

Michelle K. Lee  
*Deputy Director of the United States Patent and Trademark Office*